Patented Apr. 1, 1947

2,418,210

UNITED STATES PATENT OFFICE 2,418,210

PROCESS FOR TREATING ALKYLATION SULFURIC ACID SLUDGE

Cecil B. Wilde, Compton, Calif., assignor to Stauffer Chemical Company, a corporation of California No Drawing. Application May 1, 1944, Serial No. 533,638

9 Claims. (Cl. 23—173)

This invention relates to the recovery of the sulphuric acid value from that material produced by the treatment of certain hydrocarbons by the so-called alkylation process with sulphuric acid. The acid which remains is usually termed alkylation sulphuric acid sludge. This acid is of comparatively high strength, usually containing between about 85% and 87% acid, the remainder being hydrocarbons; the acid strength can vary between 80% and 90%.

The sulphuric acid sludges heretofore produced have been employed for various purposes such as the manufacture of ammonium sulphate or the leaching of copper ores. With an increasing use of the alkylation process, the accumulating excess of this sludge presents a serious use or disposal problem. However, because of the somewhat peculiar and quite different hydrocarbon content of alkylation sludge it has heretofore been considered impossible to use this sludge for these purposes and the disposition of the sludge has presented a problem to the industry.

I have found that an alkylation sulphuric acid sludge can be successfully treated to eliminate a very substantial portion if not all of the hydrocarbons present, and this by a comparatively inexpensive and simple operation so the remaining acid is useful. Now it has heretofore been proposed to remove hydrocarbons or carbonaceous material from other sludge acids by dilution with water so as to form a weak sulphuric acid and a liquid hydrocarbon or oil layer which was decanted from the acid. Another method has been to heat certain sludges resulting from the manufacture of petroleum alcohol to elevated temperatures so that a portion of the hydrocarbons are broken down to the form of fine granular powdered carbon which may be subsequently filtered out of the acid. Neither of these methods nor other methods for treatment of other sulphuric acid sludges have been successfully applied to alkylation sludge acids. Simple dilution of an alkylation sludge acid removes only a portion of the hydrocarbons and results in a very weak acid while heat treatment alone results in the formation of a rubbery mass of asphaltic like material from which practically no acid can be recovered. The process of the present invention provides a sulphuric acid which is useful for the manufacture of ammonium sulphate, the leaching of copper ores, the manufacture of superphosphate, and other uses. The minor quantities of carbonaceous material which remain are unobjectionable as they do not interfere with the utilization of the acid, for the acid does not, when treated in accordance with the present invention, liberate free oily or liquid hydrocarbons upon further dilution or heating.

The process of the present invention involves three steps, dilution of the sludge acid, raising of the temperature of the diluted sludge to approximately 310° F. for a period sufficient to form a solid carbon in the acid, and removal of the solid carbonaceous material which forms while the sludge is maintained at the elevated temperature. Dilution of the alkylation sludge results in the formation of a thin, asphaltic material which rises to the top of the acid. Heating the sludge to a temperature of about 310° F. transforms this asphaltic material into a solid, porous, coke-like mass readily separated by screening, filtering, decanting or other methods whereby a floating solid material may be separated from a liquid. A small amount of carbon remains in the alkylation sludge after the treatment; this is believed to be in the nature of free, solid carbon and in any case, further dilution or heating of the sludge does not result in liberation of oil or liquid hydrocarbons.

With the usual acid running in strength between 85% and 87%, I found dilution to 70% suffices. In general it is undesirable to dilute a sulphuric acid any more than is absolutely essential, and I therefore contemplate working at relatively high acid strengths, between about 67% and slightly below about 80%. Dilution to below 80% is necessary for if the acid is heated while at a strength above this it foams very extensively and little acid is recovered. If the acid is diluted to a strength below about 67%, it must be concentrated until the boiling point of the acid is about 310° F.

The temperature to which the diluted acid is heated can also be varied within reasonable limits; for example, at temperatures below 310° F. oils and tars form and the coking of the hydrocarbons is relatively slow and incomplete, while at higher temperatures the acid foams quite extensively, $SO_2$ is liberated and the acid is therefore somewhat troublesome to handle. I have found that temperatures in the range of 305° F. to 315° F. usually suffice. Maintenance of the diluted acid in this range for from 20 minutes to an hour is usually sufficient to effect formation of the coke. I prefer a temperature of 310° F.

The operation can be readily carried on in a batch or in a continuous manner by introducing the suitability diluted acid into a tank provided with a heating coil. The addition of the diluted acid to the tank is made very close to the point of dilution to utilize the heat of dilution and so that it is not necessary to heat the acid any more than is necessary. The coke is readily removed from the top of the acid in the tank, while the acid is drawn off countercurrent to the incoming acid to conserve heat. The separated coke is in the form of granules or nodules up to the size of walnuts. It is water washed to free it of acid after which it is burned or otherwise utilized.

The coke free acid is still black, containing about 1% of carbon. If it is desired to produce water white acid from this the black acid is filtered to remove as much carbon as is possible. After this the acid is fortified with sulphur trioxide or a strong acid as oleum to 98% $H_2SO_4$. If it is then heated to a temperature of 600° F.–620° F. for about one half hour to an hour it will be water white. A temperature of 610° F. has been used successfully. Filtration of the black acid is not essential; it is desirable, however, for it minimizes utilization of the fortifying acid medium.

I claim:

1. A process for the treatment of a waste sulphuric acid derived from an alkylation process and containing at least 80% $H_2SO_4$ and a substantial quantity of hydrocarbonaceous matter comprising diluting the raw, unhydrolized, waste acid with water to an acid strength between 67% and less than 80%, raising the temperature of the diluted acid to between 305° F. and 315° F. under substantially normal atmospheric pressure to coagulate a major portion of the hydrocarbonaceous matter in the acid into a solid, porous, coke-like material of granular form, and thereafter separating the granules of coke-like material from the acid.

2. A process for the treatment of a strong waste sulphuric acid derived from an alkylation process and containing about 85% to 87% of sulphuric acid with the balance hydrocarbonaceous matter comprising diluting the raw, unhydrolized, waste acid with water to approximately 70% sulphuric acid concentration, raising the temperature of the diluted acid to between about 305° F. and 315° F. under substantially normal atmospheric pressure for a period of about an hour to coagulate a major portion of the hydrocarbonaceous matter present in the acid into a solid, porous, coke-like material of granular form, and removing the granular carbonaceous material from the acid.

3. A process for treatment of waste sulphuric acid derived from an alkylation process and containing in excess of 80% $H_2SO_4$ with a substantial proportion of the balance hydrocarbonaceous material comprising mixing the raw, unhydrolized, waste acid with water to dilute the acid to an acid strength between 67% and less than 80% and raise its temperature, further heating the diluted acid to approximately 310° F. under substantially normal atmospheric pressure for a period of about an hour to coagulate the hydrocarbonaceous material into relatively massive granules of a coke-like material and separating the so formed granular carbonaceous material from the heated diluted acid.

4. A process for treatment of a waste sulphuric acid derived from an alkylation process comprising diluting the raw, unhydrolized, waste acid, heating the diluted acid to and maintaining it at a temperature between about 305° F. and 315° F. under substantially normal atmospheric pressure to coagulate hydrocarbonaceous material present into granules of a solid coke-like material, and separating said coke-like granules from the acid.

5. A process for treatment of waste sulphuric acid derived from an alkylation process and containing between about 67% and about 80% acid, water and hydrocarbonaceous material comprising maintaining the raw, unhydrolized, waste acid at a temperature between about 305° F. and 315° F. under substantially normal atmospheric pressure to coagulate the hydrocarbonaceous material into a solid, coke-like granular residue, and separating said granular residue from the acid.

6. A process for the treatment of waste sulphuric acid derived from an alkylation process and containing at least 80% as $H_2SO_4$ and a substantial quantity of hydrocarbonaceous material comprising diluting the raw, unhydrolized, waste acid with water to an acid strength between 67% and less than 80%, raising the temperature of the diluted acid to between 305° F. and 315° F. under substantially normal atmospheric pressure to coagulate substantially all the hydrocarbonaceous material into granules of a porous, coke-like material, separating said granules from the acid to reduce the carbon content thereof to about 1%, fortifying the remaining acid to an acid strength of about 98%, and maintaining the fortified acid at a temperature of about 600° F.–620° F. for from one half hour to one hour to eliminate substantially all said carbon and provide a substantially water-white acid of about 98%.

7. A process for the treatment of waste sulphuric acid derived from an alkylation process and containing at least 80% as $H_2SO_4$ and a substantial quantity of hydrocarbonaceous material comprising diluting the raw, unhydrolized, waste acid with water to an acid strength between 67% and less than 80%, raising the temperature of the diluted acid to between 305° F. and 315° F. under substantially normal atmospheric pressure to coagulate substantially all the hydrocarbonaceous material into granules of a porous, coke-like material, separating said granules from the acid to reduce the carbon content thereof to about 1%, fortifying the remaining acid to an acid strength of about 98% and maintaining the fortified acid at a temperature of about 600° F.–620° F. until the liquid is clear and substantially water-white and the acid is about 98% in strength.

8. A process for the treatment of waste sulphuric acid derived from an alkylation process and containing about 85% to 87% of sulphuric acid comprising diluting the raw, unhydrolized, waste acid with water to approximately 70% sulphuric acid concentration, raising the temperature of the diluted acid to between about 305° F. and 315° F. under substantially normal atmospheric pressure for a period of about an hour to coagulate hydrocarbonaceous material into granules of a porous coke-like material substantially removing said granules from the acid, fortifying the acid to a strength of about 98%. and maintaining the fortified liquid at a temperature of about 600° F.–620° F. for from one half hour to one hour to remove carbon traces.

9. A process for treatment of waste sulphuric acid derived from an alkylation process and containing between about 67% and about 80% acid and hydrocarbonaceous material comprising maintaining raw, unhydrolized, waste at a temperature between about 305° F. and 315° F. under substantially normal atmospheric pressure to coagulate about 99% of the material into granules of a solid, coke-like residue, substantially removing said granular residue, fortifying the remaining acid to a strength of about 98%, and maintaining the fortified liquid at a temperature of about 600° F.–620° F. until the liquid is clear and substantially water white and of about 98% in acid strength.

CECIL B. WILDE.

REFERENCES CITED

The following references are of record in the file of this patent:

UNITED STATES PATENTS

| Number | Name | Date |
|---|---|---|
| 1,511,721 | Davis | Oct. 14, 1924 |
| 1,423,766 | Hechenbleikner | July 25, 1922 |
| 2,308,163 | Ferguson | Jan. 12, 1943 |
| 2,345,506 | Slotterbeck | Mar. 28, 1944 |
| 2,302,825 | Wilde | Nov. 24, 1942 |
| 2,288,370 | Read | June 30, 1942 |
| 2,067,985 | Sargent | Jan. 19, 1937 |
| 2,302,825 | Wilde | Nov. 24, 1942 |
| 2,379,823 | Mottern | July 3, 1945 |